United States Patent
Rothenberger et al.

(10) Patent No.: US 10,641,163 B2
(45) Date of Patent: May 5, 2020

(54) METHOD FOR OPERATING A SUPERCHARGED INTERNAL COMBUSTION ENGINE

(71) Applicant: Dr. Ing. h.c. F. Porsche Aktiengesellschaft, Stuttgart (DE)

(72) Inventors: Peter Rothenberger, Philippsburg (DE); Erwin Rutschmann, Tiefenbronn (DE); Dietmar Schwarzenthal, Ditzingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 9 days.

(21) Appl. No.: 15/472,563

(22) Filed: Mar. 29, 2017

(65) Prior Publication Data

US 2017/0292439 A1 Oct. 12, 2017

(30) Foreign Application Priority Data

Apr. 6, 2016 (DE) .................. 10 2016 106 306

(51) Int. Cl.
*F02B 37/00* (2006.01)
*F02B 37/02* (2006.01)
*F02D 13/02* (2006.01)

(52) U.S. Cl.
CPC .......... *F02B 37/002* (2013.01); *F02B 37/025* (2013.01); *F02D 13/0257* (2013.01); *Y02T 10/144* (2013.01); *Y02T 10/18* (2013.01)

(58) Field of Classification Search
CPC .... F02B 37/002; F02B 37/025; F02B 37/013; F02D 13/0275; Y02T 10/144
(Continued)

(56) References Cited

U.S. PATENT DOCUMENTS 8,726,658 B2 * 5/2014 Styles .................. F02B 37/12
60/612
2003/0000211 A1 1/2003 Drangel et al.
(Continued)

FOREIGN PATENT DOCUMENTS

DE 4242494 C1 9/1993
DE 102005055996 A1 5/2007
(Continued)

OTHER PUBLICATIONS

German Search Report dated Jan. 23, 2017.
(Continued)

*Primary Examiner* — Thai Ba Trieu
(74) *Attorney, Agent, or Firm* — Gerald E. Hespos; Michael J. Porco; Matthew T. Hespos

(57) ABSTRACT

A supercharged internal combustion engine has cylinder groups with plural cylinders and plural exhaust gas turbochargers. Exhaust gas can be fed to at least one first exhaust gas turbocharger from first outlet valves of the cylinders of the first and second cylinder groups via at least one first exhaust manifold. Exhaust gas can be fed to at least one second exhaust gas turbocharger from second outlet valves of cylinders of the first and second cylinder groups via a second exhaust manifold. At low rotational speeds and/or in part load and/or non-steady state operation, exhaust gas can be fed via the first exhaust manifolds that are connected to the first outlet valves per cylinder group to a turbine of the first exhaust gas turbocharger in flows that can be divided in the inflow region of the turbine, while the second exhaust gas turbocharger is inactive.

9 Claims, 4 Drawing Sheets

(58) Field of Classification Search
USPC .................................. 60/602, 612; 123/562
See application file for complete search history.

(56) References Cited

U.S. PATENT DOCUMENTS

| | | | |
|---|---|---|---|
| 2007/0130948 A1 | 6/2007 | Boehm et al. | |
| 2012/0096853 A1* | 4/2012 | Taylor | F02B 37/013 60/601 |
| 2012/0240574 A1* | 9/2012 | Friedfeldt | F02B 37/001 60/612 |
| 2016/0025044 A1* | 1/2016 | Martinez-Botas | F02B 37/025 60/605.2 |
| 2016/0138491 A1* | 5/2016 | Casal Kulzer | F02B 37/013 60/612 |
| 2018/0371992 A1* | 12/2018 | Mehta | F02B 37/025 |

FOREIGN PATENT DOCUMENTS

| | | | | |
|---|---|---|---|---|
| DE | 102006042443 A1 * | 3/2008 | | F02B 37/025 |
| DE | 102007058296 A1 | 6/2009 | | |
| DE | 102008020405 A1 | 10/2009 | | |
| DE | 102010060110 A1 | 4/2012 | | |
| FR | 2844552 B1 * | 5/2006 | | F02B 37/025 |
| JP | H055420 A | 1/1993 | | |
| JP | H06280586 A | 10/1994 | | |
| JP | H0797927 A | 4/1995 | | |
| JP | 2001073895 A | 3/2001 | | |
| JP | 2003065061 A | 3/2003 | | |
| JP | 2009085020 A | 4/2009 | | |
| JP | 2009144655 A | 7/2009 | | |
| JP | 2011132921 A | 7/2011 | | |

OTHER PUBLICATIONS

Abgasturbolader: Sinnvolle Nutzung der Abgasenergie. by Michael Mayer.
English Translation of Japanese Office Action dated Dec. 4, 2017.

* cited by examiner

METHOD FOR OPERATING A SUPERCHARGED INTERNAL COMBUSTION ENGINE

CROSS REFERENCE TO RELATED APPLICATION

This application claims priority under 35 USC 119 to German Patent Appl. No. 10 2016 106 306.1 filed on Apr. 6, 2016, the entire disclosure of which is incorporated herein by reference.

BACKGROUND

1. Field of the Invention

The invention relates to a method and to an exhaust gas routing system for operating a supercharged internal combustion engine having a plurality of cylinder groups comprising in each case a plurality of cylinders and having a plurality of exhaust gas turbochargers, it being possible for exhaust gas to be fed to at least one first exhaust gas turbocharger from first outlet valves of the cylinders of the first cylinder group and from first outlet valves of the cylinders of the second cylinder group, and it being possible for exhaust gas to be fed to at least one second exhaust gas turbocharger from second outlet valves of cylinders of the first cylinder group and from cylinders of the second cylinder group via a second exhaust manifold.

2. Description of the Related Art

A reduction in displacement in conjunction with the supercharging of the internal combustion engine, generally known as "downsizing", has proven to be effective for reducing the fuel consumption and $CO_2$ emissions. Here, in conjunction with a direct injection of the fuel, considerable potential can be developed for reducing both fuel consumption and the $CO_2$ emissions. This is achieved by reducing inner friction of the mechanical components, shifting the operating point of the internal combustion engine into higher load ranges, and reducing the weight of the internal combustion engine due to smaller displacements or pistons and/or also as a result of a reduced number of cylinders.

A multiplicity of possible solutions are known from the prior art and from practice. These possible solutions also deal with special features during the operation of the superchargers that are necessary for supercharging, in particular the exhaust gas turbochargers that are preferably used.

DE 42 42 494 C1 provides an exhaust gas turbocharger with a turbine that has adjustable flow guide apparatuses that are adapted correspondingly for multiple-stage turbines. The adaptation is to take place in terms of the adjustment and in terms of the geometry of the flow guide apparatus. Operating conditions in a turbine of this type may include high temperatures and very high rotational speeds, and can lead to functional problems with respect to the movable components for adjusting the guide apparatus.

DE 10 2007 058 296 A1 discloses a turbine of an exhaust gas turbocharger with a turbine housing that has plural inflow chambers arranged in a distributed manner over the circumference of the turbine wheel. Each inflow chamber extends over a different circumferential angular region and can be loaded by different flows of exhaust gas flow.

DE 10 2008 020 405 A1 discloses an exhaust gas turbocharger for an internal combustion engine. The exhaust gas turbocharger has a turbine housing with at least two spiral ducts, at least one of which comprises at least two fluidically separate spiral segment ducts that can be coupled to different exhaust gas lines of the internal combustion engine.

DE 10 2010 060 110 A1 discloses an internal combustion engine with plural cylinder groups and plural exhaust gas turbochargers. Internal combustion engine exhaust gas is fed from first outlet valves of the cylinders of the first cylinder group to a first exhaust gas turbocharger via a first exhaust manifold, whereas exhaust gas is fed from second outlet valves of the cylinders of the first cylinder group to the first exhaust gas turbocharger via a second exhaust manifold of the first cylinder group. Exhaust gas also is fed from first outlet valves of the cylinders of the second cylinder group to the second exhaust gas turbocharger, which is assigned to the second cylinder group, via a first exhaust manifold of the second cylinder group, and exhaust gas can be fed from second outlet valves of the cylinders of the second cylinder group to the second exhaust gas turbocharger via a second exhaust manifold of the second cylinder group. The first exhaust manifolds of the first and the second cylinder group are coupled to one another and have different flow cross sections. As a result, the supercharging is to be improved. The second exhaust gas turbocharger can be switched on or off in a manner that is dependent on the operating state of the internal combustion engine.

SUMMARY

The invention relates to a method for operating a supercharged internal combustion engine having plural cylinder groups. The method improves performance with reduced fuel consumption and reduced emissions. The method achieves a considerable improvement in the response behavior at low rotational speeds of the internal combustion engine, in part load and/or non-steady state operation and improves supercharging behavior over the entire rotational speed range of the internal combustion engine.

The invention particularly relates to a method for operating a supercharged internal combustion engine and/or in an exhaust gas routing system and method for an internal combustion engine. The method is carried out so that at low rotational speeds of the internal combustion engine and/or in part load and/or non-steady state operation, exhaust gas can be fed via exhaust manifolds that are connected to the first outlet valves per cylinder group to a turbine of a first exhaust gas turbocharger in flows that can be divided in the inflow region of the turbine. However, the second exhaust gas turbocharger is inactive at low rotational speeds of the internal combustion engine and/or in part load and/or non-steady state operation and can be switched on only at relatively high or high rotational speeds of the internal combustion engine and/or in full load operation by opening the second outlet valves and feeding of exhaust gas via the second of the exhaust manifolds.

The inactivity of the second turbocharger can be achieved as a consequence of a valve stroke=0 or a minimum valve stroke of the second outlet valves that are connected to the second exhaust manifolds.

The exhaust gas volumetric flow can be connected, for example in full load operation, via an expansion tube of the first exhaust manifold of the second cylinder group via a flap-control or valve-control.

The method can be implemented by an exhaust gas routing system for an internal combustion engine. The exhaust gas routing system may have the first exhaust manifolds configured with a small cross section and can be connected with a small length to the exhaust gas inlet into the turbine of the exhaust gas turbocharger.

The exhaust gas routing system may have inflow ducts that are separate at least in the turbine of the first exhaust gas turbocharger and may run spirally around the impeller of the turbine to achieve a split introduction of exhaust gas flows.

Optimum operation of the exhaust gas turbochargers at high rotational speeds and/or under full load may be achieved if the second outlet valves are designed for very early opening for feeding an exhaust gas flow to the second turbine of the second exhaust gas turbocharger. This early opening may be achieved via a cam of the valve control. The cam may have a particularly broad profile and may be on a camshaft.

The turbines of the exhaust gas turbochargers of one embodiment are radial turbines, however axial or "mixed flow" turbines may be used.

A particularly satisfactory response behavior in the exhaust gas supercharging at low rotational speeds is achieved by configuring the first exhaust manifolds for direct attachment on the shortest possible path to the respective first outlet valves of the cylinder groups to the inflow region of the first turbine of the first turbocharger, and by a configuration with a small flow cross section, as a consequence of the cyclical sequence of the combustion in a reciprocating piston internal combustion engine via the pulse-like loading of the turbine which emanates from this. This also can be aided, in multiple-cylinder internal combustion engines, by selecting the firing intervals of the individual cylinders during operation of the internal combustion engine so that they have the greatest possible spacing.

The method of the invention and the exhaust gas routing system for carrying out the method are suitable for internal combustion engines for motor vehicles.

In addition to an improvement in the operating conditions in part load and/or in non-steady state operation, the application of the method of the invention and of a corresponding exhaust gas routing system results in a considerable reduction in the mean exhaust gas temperature during operation under high load as a result of an increase of the exhaust gas conducting volume upstream of the turbine by way of the different routing of the exhaust gas flows. Boosting of what is known as the ram induction principle can be achieved by way of the corresponding design of the exhaust gas routing means in the first exhaust gas turbocharger.

Exemplary embodiments of the subject matter of the invention are shown and described in the drawing. Features, preferred developments and details of the subject matter of the invention and the inventive method are to be explained in greater detail using said exemplary embodiments.

The invention is not restricted here to the exemplary embodiments that are shown and described, for example in the case of an internal combustion engine having six cylinders. Rather, the invention can also be realized in an internal combustion engine having separate cylinder groups if they comprise two cylinders, four cylinders or more cylinders in, for example, a V-arrangement, W-arrangement, inline arrangement or else boxer arrangement.

The drawing shows the subject matter of the invention in a diagrammatic illustration, in particular in relation to the course of the exhaust gas flows from the cylinder outlet as far as the turbine of the exhaust gas turbocharger.

DETAILED DESCRIPTION

Figures 1, 1A:
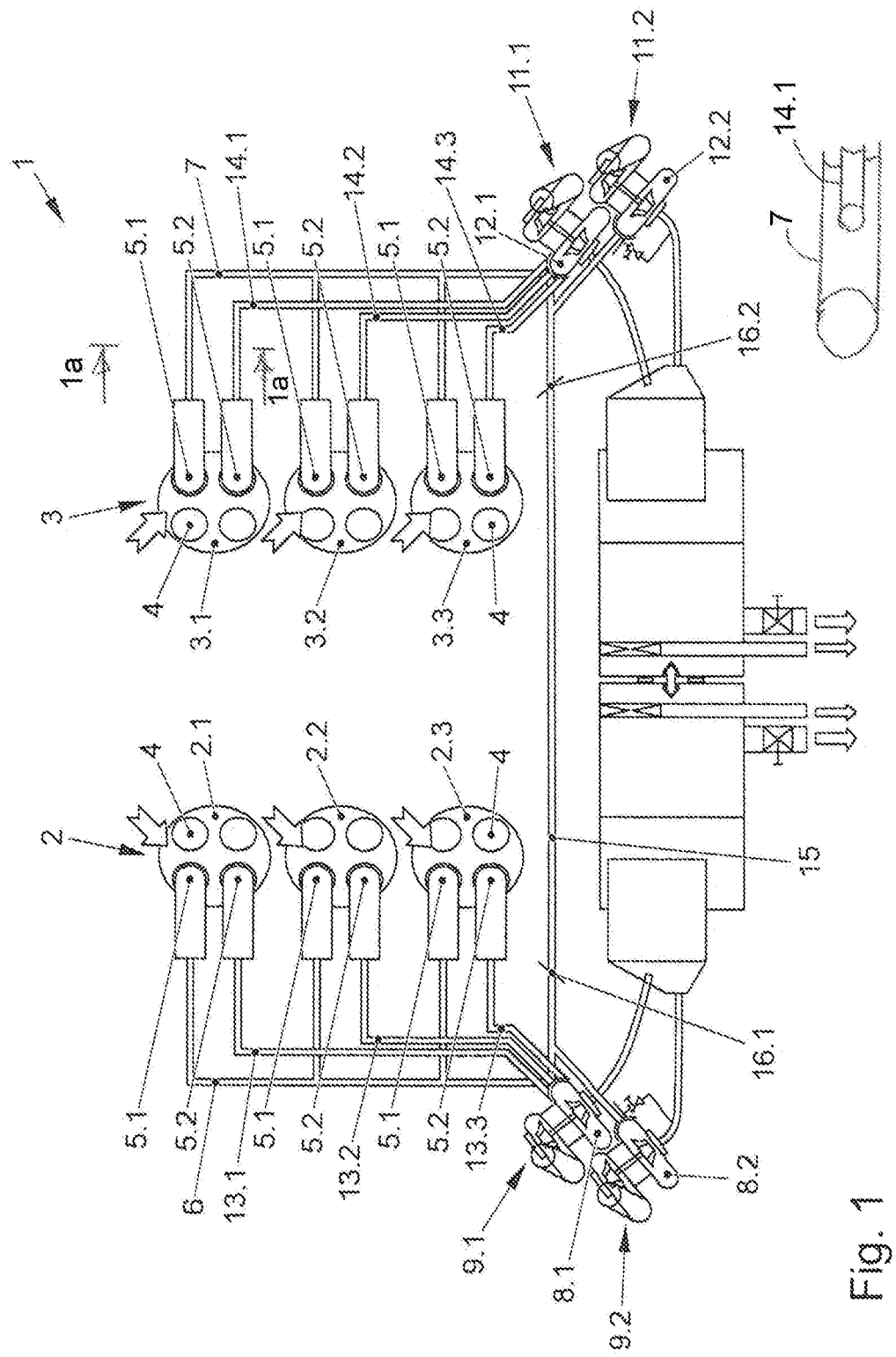
FIG. 1 is a diagrammatic illustration of the course of the exhaust gas flows via the outlet valves of a six-cylinder internal combustion engine, arranged into two cylinder groups with the associated exhaust gas turbochargers
FIG. 1a is a cross-section taken along line 1a-1a in FIG. 1.

An internal combustion engine 1 in accordance with one embodiment of the invention has two cylinder groups 2 and 3. The cylinder group 2 has three cylinders 2.1, 2.2 and 2.3, and the cylinder group 3 has three 3.1, 3.2 and 3.3. Each of the cylinders 2.1, 2.2 and 2.3 or 3.1, 3.2 and 3.3 has two inlet valves 4 and two outlet valves 5.1 and 5.2. The outlet valves 5.1 of all three cylinders 2.1, 2.2 and 2.3 of the first cylinder group 2 are connected in series via a common exhaust manifold 6 with regard to the exhaust gas flow after a combustion operation in the cylinders. The outlet valves 5.1 of the cylinders 3.1, 3.2 and 3.3 of the second cylinder group 3 likewise are connected via a common exhaust manifold 7 with regard to their exhaust gas flow after a combustion operation in the cylinders. In the exemplary embodiment of FIG. 1, the exhaust manifolds 6 and 7 open into an exhaust gas inflow region of the at least one turbine 8.2 or 12.2 of the at least one exhaust gas turbocharger 9.2 or 11.2. In the exemplary embodiment according to FIG. 1, the exhaust gas turbocharger 9.2 or 11.2 can be switched on or off depending on the operating conditions.

At low rotational speeds of the internal combustion engine and/or in part load and/or non-steady state operation, the outlet valves 5.1 in both cylinder groups 2 and 3 are closed via, for example, corresponding cams on a camshaft (not shown) that actuates the inlet and outlet valves, that is to say are provided with a stroke=0 or at any rate with a minimum stroke. Thus, in these combustion cycles, the entire exhaust gas flow is fed exclusively or virtually exclusively via the outlet valves 5.2 and via exhaust manifolds 13.1, 13.2, 13.3 or 14.1, 14.2, 14.3 that are configured to be relatively short and with a low cross section. The exhaust gas flow then continues to the turbine/turbines 8.1 or 12.1 of the exhaust gas turbochargers 9.1 and 11.1 that are arranged parallel to the exhaust gas turbocharger/turbochargers 9.2 or 11.2. This achieves a situation where a pulse-like process of the supercharging takes place in the exhaust gas turbocharger via the combustion cycles of the internal combustion engine in low rotational speed ranges and leads to a satisfactory response behavior of the supercharged internal combustion engine.

In the exemplary embodiment of FIG. 1, the exhaust manifolds 13.1, 13.2, 13.3 or 14.1, 14.2, 14.3 are shown as lines that are routed separately to the inflow region into the turbines 8.1 or 12.1. However, it is also readily conceivable, in a similar manner to the exhaust manifolds 6 and 7, to combine the exhaust gas flow that is ejected from the outlet valves in one line or to route it within a common exhaust manifold into, for example, three separate line ducts, and then to divide the exhaust gas flow in the inflow region into the turbines 8.1 or 12.1 into a plurality of (for example, three) flows; see the following detailed explanation with respect to FIGS. 3 to 7.

The two exhaust manifolds 6 and 7 ideally are configured as a connection that is as direct as possible between the outlet region of the outlet valves 5.1 and the inflow region of the turbine 8.2 or 12.2 of the exhaust gas turbocharger/turbochargers 9.2 or 11.2. The exhaust manifolds 6 and 7 preferably are designed with a great cross section for large volumetric flows. The homogeneous supercharging or ram induction that is desired at high rotational speeds and/or at full load of the internal combustion engine is achieved first of all by virtue of the fact that the exhaust manifolds 6 and 7 are configured with a relatively great cross section. In addition, a correspondingly large volume can be produced by way of a corresponding adaptation of the length of the exhaust manifolds 6 and 7, with the result that a homogeneous volumetric flow is set.

In relatively high load operation of the internal combustion engine 1 and/or at full load, that is to say at correspondingly higher or high rotational speeds, the outlet valves 5.1 of the two cylinder groups 2 and 3 are opened, once again controlled via cams of the camshaft. The opening ideally takes place via a cam, configured with a very broad profile, for controlling the outlet valves 5.1, with the result that very early opening of the second outlet valves 5.1 takes place and therefore the switching on of the exhaust gas turbocharger/turbochargers 9.2 or 11.2 which are connected in parallel to the exhaust gas turbochargers 9.1 or 11.1 can be achieved via the feed of exhaust gas into their turbines 8.2 or 12.2. As a consequence of the early opening, the outlet pulses of the exhaust gas flow out of the cylinders initially are passed only to the exhaust manifolds 6 and 7 that are connected to the outlet valves 5.1 of the two cylinder groups 2 and 3 and are of large-volume configuration. As a result, pressure pulses are reduced or dissipated and a largely homogeneous mass flow in the exhaust manifolds is achieved.

Moreover, the exhaust manifolds 6 and 7 can be connected via an expansion tube 15 that can be opened or closed by way of flaps 16.1 or 16.2 (or valves). In part load operation and/or at low rotational speeds, the flaps can be closed (as are the outlet valves 5.1). Thus, the first exhaust manifolds 13.1, 13.2, 13.3 or 14.1, 14.2, 14.3, which have a short length and a small cross section to define a small volume, act for ram induction. In full load operation at high rotational speeds the volume for the exhaust gas flows is increased via the opening of the flaps 16.1 and 16.2, so that a corresponding support for the transition from one ram induction to another is achievable.

Figure 2:
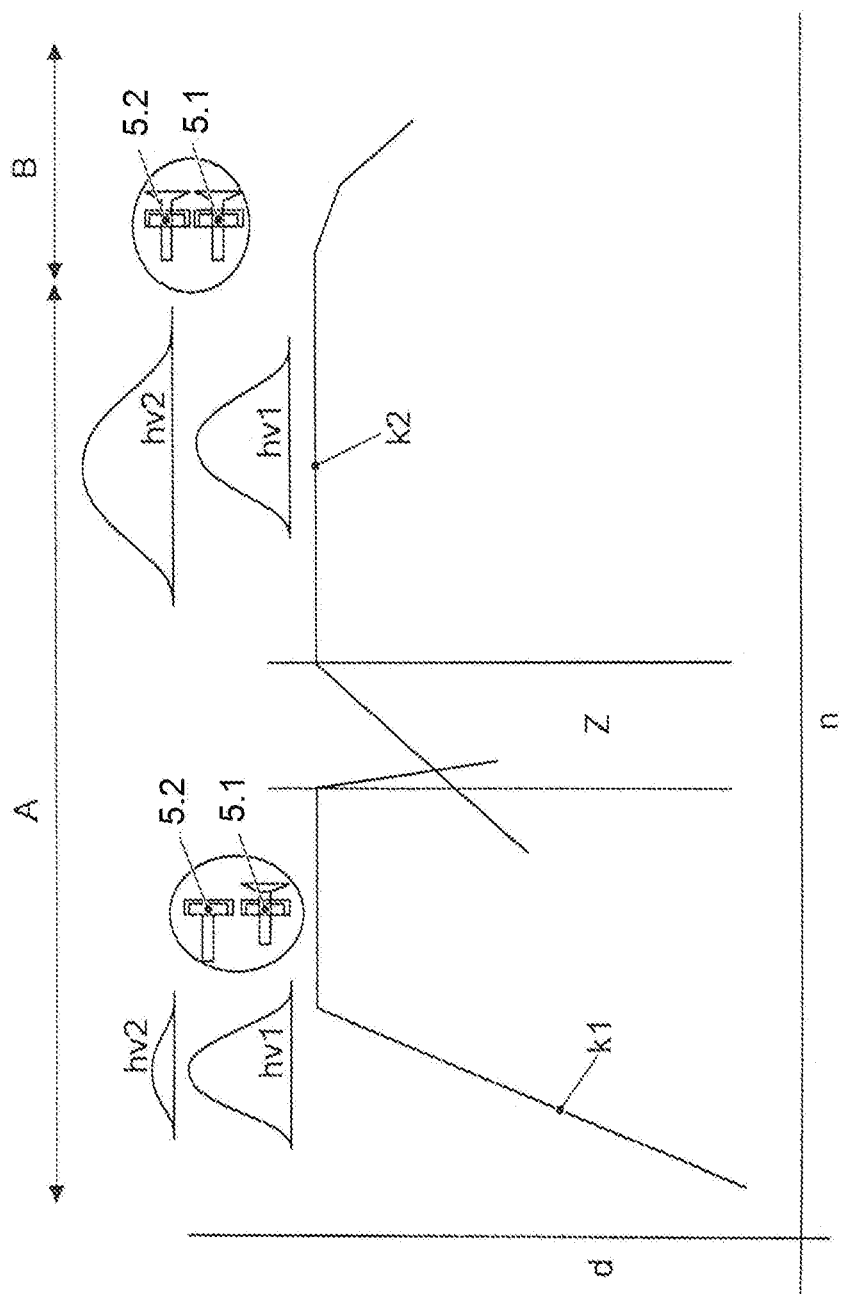
FIG. 2 shows the boost pressure profile during operation with one turbocharger in contrast to the boost pressure profile during operation with two turbochargers.
Figure 4:
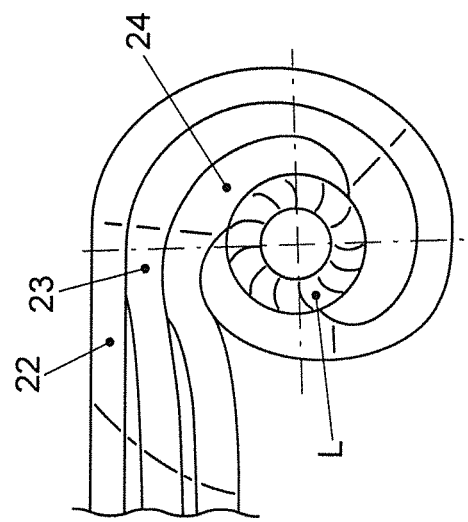
FIGS. 3, 4, 5, 6 and 7 diagrammatically show a partial cross section of turbine housings and the inflow regions thereof for carrying out the inventive method.
Figure 3:
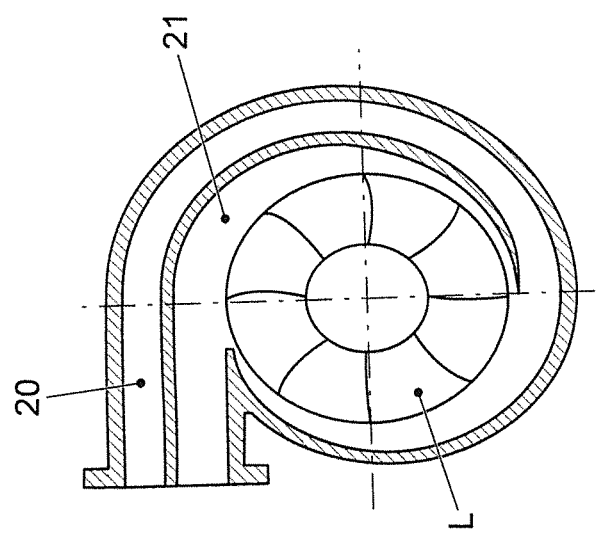

FIG. 2 shows a diagram (the boost pressure d is plotted against the rotational speed n) of the relationship between the rotational speed n and the boost pressure d that can be provided by the exhaust gas turbochargers 9.1 and 11.1. Curves hv1 show rhe volumetric flow of exhaust gas to the exhaust gas turbochargers 9.1, 11.1 and curves hv2 show the volumetric flow to the exhaust gas turbochargers 9.2, 11.2. If the outlet valves 5.1 are closed and the exhaust gas turbocharger 9.2 or 11.2 is inactive, a very rapid rise in the boost pressure d in the exhaust gas turbocharger 9.1 or 11.1 is set as a consequence of the low volume (curves hv1 and hv2 above curve k1) and the direct attachment that takes place on the shortest path possible of the exhaust manifolds 13.1, 13.2, 13.3 or 14.1, 14.2, 14.3 to the regions of the outlet valves 5.2 with the inlet region of the turbine 8.1 or 12.1 of the exhaust gas turbocharger 9.1 or 11.1—see curve k1 in FIG. 2. As a consequence of the low volume and the low volumetric flow in the first exhaust manifolds 13.1, 13.2, 13.3 or 14.1, 14.2, 14.3 (curves hv1 and hv2 above curve k1), the boost pressure d could drop abruptly when the rotational speed n of the internal combustion engine rises. To prevent this so-called "turbo lag", curve k2 shows that the outlet valves 5.1 are switched on/opened (switch-on range Z in FIG. 2) and therefore the second turbocharger/turbochargers 9.2 and/or 11.2 of the second turbocharger group are/is switched on before the boost pressure d drops. A considerable increase in the volumetric flow (curve hv2 above curve k2) to the turbochargers 9.2, 11.2 is set by way of the second exhaust manifolds 6 and 7 of correspondingly large-volume configuration, and therefore a transition from the shockwave supercharging to homogeneous ram induction.

The increase in volume for routing the exhaust gas flow also can be supplemented by opening of the flaps 16.1 and 16.2 in the expansion tube 15. FIG. 2 shows the opening of the expansion tube 15 with the arrows A and B: in the case of arrow A, the expansion tube is closed; it is opened (see arrow B) as soon as the boost pressure d is on the verge of dropping at very high rotational speeds.

As has already been described, it is expedient to overlap the switch-on range for the second turbocharger 9.2 or 11.2 via early opening of the outlet valves 5.1 with the operating range of the turbocharger/turbochargers 9.1 and/or 11.1. This can be achieved by way of outlet valves 5.1 with a correspondingly broad profiling to make early opening of the second outlet valves 5.1 possible.

The method according to the invention and/or the exhaust gas routing system for carrying out the inventive method can be assisted appropriately by virtue of the fact that the inflow region of the exhaust gas flow into the turbines of the exhaust gas turbochargers is of corresponding design. Thus, for example, the volumetric flow of the exhaust manifolds 13, 14 and possibly also the exhaust manifolds 6, 7 in the inflow region of the turbine 8.1, 8.2, 12.1, 12.2 can be divided into a plurality of flows. This can take place via a double flow duct 20 or 21 (see FIG. 3; for example, in the case of a four-cylinder internal combustion engine) or via a triple flow with ducts 22, 23 and 24 (for example, in the case of a six-cylinder internal combustion engine; see FIG. 4). The impeller L of the turbine is loaded homogeneously in a manner distributed over its circumference by way of a volumetric flow division of this type.

Figure 7:
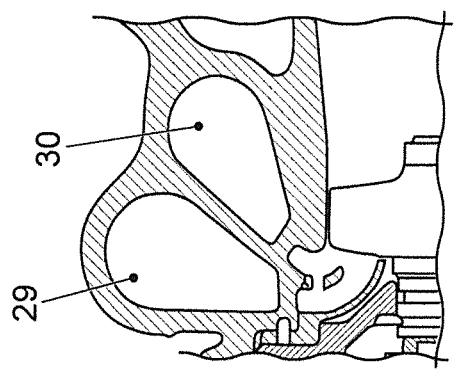
Figure 6:
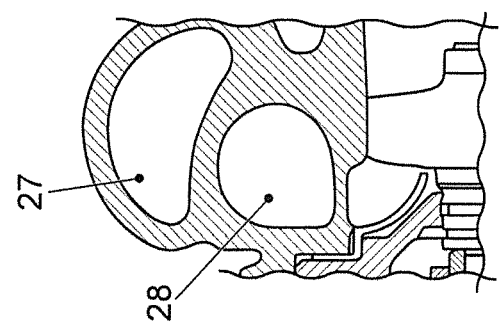
Figure 5:
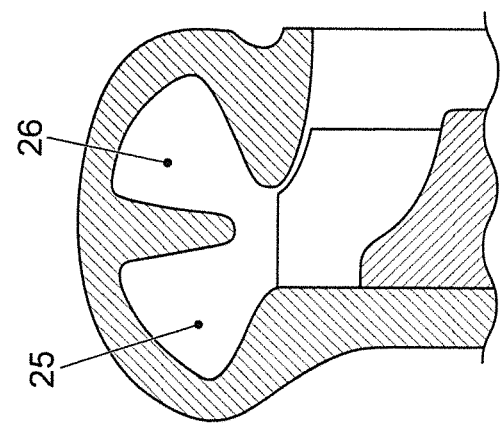

FIGS. 5, 6 and 7 diagrammatically show housing designs for turbines of exhaust gas turbochargers. FIG. 5 shows the arrangement of flow ducts in twin form (ducts 25 and 26). FIGS. 6 and 7 show a somewhat different arrangement in twin form using the ducts 27, 28 or 29 and 30.

It is particularly expedient in every case (this also applies to the twin arrangements of the ducts shown in FIGS. 5-7) to distribute the opening of the ducts onto the impeller L of the turbine in a manner which is offset spirally onto the outer circumference of the impeller L.

The impeller of the turbine of the exhaust gas turbocharger can be configured as a radial, axial or a "mixed flow" version (radial-axial) by a person skilled in this art.

| List of Designations | |
|---|---|
| 1 | Internal combustion engine |
| 2 | Cylinder group |
| 2.1, 2.2, 2.3 | Cylinder |
| 3 | Cylinder group |
| 3.1, 3.2, 3.3 | Cylinder |
| 4 | Inlet valve |
| 5.1 | Second outlet valve |
| 5.2 | First outlet valve |
| 6 | Second exhaust manifold, cylinder group 2 |
| 7 | Second exhaust manifold, cylinder group 3 |
| 8.1 | Turbine of exhaust gas turbocharger 9.1 |
| 9.1 | Exhaust gas turbocharger |
| 9.2 | Exhaust gas turbocharger |
| 11.1 | Exhaust gas turbocharger |
| 12.1 | Turbine of exhaust gas turbocharger 11.1 |

| List of Designations | |
|---|---|
| 12.2 | Turbine of exhaust gas turbocharger 11.2 |
| 13.1, 13.2, 13.3 | First exhaust manifold, cylinder group 2 |
| 14.1, 14.2, 14.3 | First exhaust manifold, cylinder group 3 |
| 15 | Expansion tube |
| 16.1, 16.2 | Flap/valve |
| 20, 21, 22, 23 24, 25, 26, 27 28, 29, 30 | Channels in the inflow region, turbine |
| 31 | Catalytic converter |
| 32 | Catalytic converter |
| 33 | Muffler |
| 34 | Muffler |
| A | Closed expansion tube 15 |
| B | Open expansion tube 15 |
| Z | Switch-on range |
| n | Rotational speed |
| d | Boost pressure |
| k1 = | Curve 1 in FIG. 2 |
| k2 = | Curve 2 in FIG. 2 |
| L | Impeller |

What is claimed is:

1. A method for operating a supercharged internal combustion engine having first and second cylinder groups, each of the first and second cylinder groups having a plurality of cylinders and each of the plurality of cylinders having first and second outlet valves, each of the first and second cylinder groups having a first exhaust gas turbocharger and first exhaust manifolds providing communication respectively between the first outlet valves and the first exhaust gas turbocharger, each of the first exhaust manifolds delivering a first volumetric flow, each of the first and second cylinder groups further having a second exhaust gas turbocharger and a second exhaust manifold providing communication between the second outlet valves and the second exhaust gas turbocharger, the second exhaust manifold delivering a second volumetric flow that is larger than the first volumetric flow of said each of the first exhaust manifolds, the method comprising steps of:

via actuating cams on cam shafts respectively, keeping the second outlet valves closed and thereby deactivating the second exhaust gas turbocharger while operating the first outlet valves and the first exhaust gas turbocharger when the supercharged internal combustion engine is operated at least one of at low rotational speeds, in partial load, and in non-steady state operation; and switching to open both of the first and second outlet valves and to operate both of the first and second exhaust gas turbochargers when the supercharged internal combustion engine is operated at least one of at high rotational speeds and in full load.

2. The method of claim 1, wherein the step of keeping the second outlet valve closed comprises setting a valve stroke=0 or a minimum valve stroke of the second outlet valves that are connected to the second exhaust manifolds when the supercharged internal combustion engine is operated at least one of at the low rotational speed, in the partial load, and in the non-steady state operation.

3. The method as claimed in claim 1, further comprising combining the exhaust gas of the second exhaust manifolds of the first and second cylinder groups via a flap-controlled or valve-controlled expansion tube.

4. The method of claim 1, further comprising:

using the actuating cams on the cam shafts for opening the second outlet valves before opening the first outlet valves the supercharged internal combustion engine is operated at least one of at high rotational speeds and in high load for feeding the exhaust gas to the second exhaust gas turbocharger before feeding the exhaust gas to the first exhaust gas turbocharger.

5. A supercharged internal combustion engine comprising:

at least one cylinder group, the at least one cylinder group having a plurality of cylinders and each of the cylinders having first and second outlet valves that are operated by cams on a camshaft; and an exhaust gas routing system;

wherein the exhaust gas routing system further comprises:

a first exhaust gas turbocharger and first exhaust manifolds providing communication respectively between the first outlet valves and the first exhaust gas turbocharger;

wherein each of the first exhaust manifolds is to generate a homogenous volumetric flow; and a second exhaust gas turbocharger and a second exhaust manifold providing communication between the second outlet valves and the second exhaust gas turbocharger;

wherein the second exhaust manifold is to generate a volumetric flow;

wherein the volumetric flow generated by the second exhaust manifold is larger than the homogeneous volumetric flow generated by said each of the first exhaust manifolds.

6. The exhaust gas routing system of claim 5, wherein at least one of a cross section of each of the first exhaust manifolds is smaller than a cross section of the second exhaust manifold and a length of each of the first exhaust manifolds is shorter than a length of the second exhaust manifold.

7. The exhaust gas routing system for an internal combustion engine of claim 6, wherein the at least one second exhaust manifold has a larger cross section than any of the first exhaust manifolds for generating a homogeneous volumetric flow to an exhaust gas inlet into a turbine of the second exhaust gas turbocharger.

8. The exhaust gas routing system of claim 5, wherein the first exhaust gas turbocharger has a turbine and the first exhaust gas manifolds extend respectively to separately running inflow ducts arranged in the turbine of the first exhaust gas turbocharger for introducing divided exhaust gas flows from the plurality of cylinders respectively.

9. The exhaust gas routing system of claim 5, wherein each of the exhaust gas turbochargers has a turbine with an inflow duct; and wherein the inflow duct of the turbine of said each of the exhaust gas turbochargers are configured as separately running spiral ducts.

* * * * *